United States Patent
Massal et al.

(10) Patent No.: US 9,682,775 B2
(45) Date of Patent: Jun. 20, 2017

(54) ROTORCRAFT ROTOR INCLUDING A FLAPPING ABUTMENT MECHANISM, AND A ROTORCRAFT

(71) Applicant: AIRBUS HELICOPTERS, Marignane (FR)

(72) Inventors: Fabien Massal, Saint Chamas (FR); Alain Eberhard, Velaux (FR)

(73) Assignee: AIRBUS HELICOPTERS, Marignane (FR)

( * ) Notice: Subject to any disclaimer, the term of this patent is extended or adjusted under 35 U.S.C. 154(b) by 319 days.

(21) Appl. No.: 14/623,148

(22) Filed: Feb. 16, 2015

(65) Prior Publication Data

US 2015/0239556 A1    Aug. 27, 2015

(30) Foreign Application Priority Data

Feb. 21, 2014  (FR) ...................................... 14 00462

(51) Int. Cl.
 *B64C 27/57* (2006.01)
 *B64C 27/32* (2006.01)
 *B64C 27/605* (2006.01)

(52) U.S. Cl.
 CPC ............ *B64C 27/57* (2013.01); *B64C 27/322* (2013.01); *B64C 27/605* (2013.01)

(58) Field of Classification Search
 CPC ........ B64C 27/322; B64C 27/39; B64C 27/37
 USPC ....... 416/131, 132, 133, 135, 139, 106, 142, 416/80, 145, 147, 149, 153
 See application file for complete search history.

(56) References Cited

U.S. PATENT DOCUMENTS

| | | | |
|---|---|---|---|
| 2,151,215 A | | 3/1939 | Larsen |
| 2,465,674 A | * | 3/1949 | Crowell ................ B64C 27/322 416/168 R |
| 2,481,747 A | | 9/1949 | Hiller, Jr. |
| 2,549,887 A | * | 4/1951 | Buivid .................. B64C 27/322 416/140 |
| 2,614,640 A | * | 10/1952 | Buivid .................. B64C 27/322 416/140 |

(Continued)

FOREIGN PATENT DOCUMENTS

| | | | | |
|---|---|---|---|---|
| CA | 2533201 A1 | * | 3/2005 | ............. B64C 27/35 |
| EP | 2778058 A1 | * | 9/2014 | ............... F16D 3/60 |

(Continued)

OTHER PUBLICATIONS

French Search Report for FR 1400462, Completed by the French Patent Office on Oct. 8, 2014, 6 Pages.

*Primary Examiner* — Kenneth Bomberg
*Assistant Examiner* — Brian Delrue
(74) *Attorney, Agent, or Firm* — Brooks Kushman P.C.

(57) ABSTRACT

A rotor for a rotorcraft, the rotor having a plurality of lift assemblies, together with a flapping abutment mechanism for each lift assembly. Each abutment mechanism has a projection secured to a lift assembly with an abutment end provided with an inner face and an outer face, and at least one pivotally-mounted lever extending longitudinally from a flyweight to a hook. The hook is provided with two walls in elevation and a bottom wall forming a periphery that defines the groove, a first wall in elevation having an upper bearing zone for blocking the inner face and a second wall in elevation including a lower bearing zone for blocking the outer face.

20 Claims, 3 Drawing Sheets

(56) References Cited

U.S. PATENT DOCUMENTS

| | | | | |
|---|---|---|---|---|
| 2,717,653 A * | 9/1955 | Emmerson | ............ | B64C 27/322 |
| | | | | 416/140 |
| 2,719,593 A * | 10/1955 | Alex | .................... | B64C 27/322 |
| | | | | 416/140 |
| 2,928,478 A | 3/1960 | Du Pont | | |
| 3,533,713 A | 10/1970 | Salmun | | |
| 3,853,426 A * | 12/1974 | Rybicki | .................. | B64C 27/35 |
| | | | | 416/134 A |
| 3,932,059 A * | 1/1976 | Rybicki | ................ | B64C 27/322 |
| | | | | 416/140 |
| 4,028,001 A * | 6/1977 | Watson | .................. | B64C 27/48 |
| | | | | 416/134 A |
| 4,203,708 A * | 5/1980 | Rybicki | .................. | B64C 27/35 |
| | | | | 416/134 A |
| 4,235,570 A * | 11/1980 | Ferris | ..................... | B64C 27/35 |
| | | | | 416/134 A |
| 4,242,047 A * | 12/1980 | Ferris | ..................... | B64C 27/35 |
| | | | | 416/134 A |
| 4,289,448 A | 9/1981 | Declerco et al. | | |
| 4,304,525 A * | 12/1981 | Mouille | ................. | B64C 27/32 |
| | | | | 416/134 A |
| 4,368,006 A * | 1/1983 | Ferris | .................... | B64C 27/322 |
| | | | | 415/140 |
| 4,549,852 A * | 10/1985 | Hibyan | ................. | B64C 27/322 |
| | | | | 416/140 |
| 4,551,067 A * | 11/1985 | Caramaschi | ......... | B64C 27/322 |
| | | | | 416/106 |
| 4,652,210 A * | 3/1987 | Leman | .................. | B64C 27/322 |
| | | | | 416/134 A |
| 5,007,799 A | 4/1991 | Mouille et al. | | |
| 5,601,408 A * | 2/1997 | Hunter | .................... | B64C 27/35 |
| | | | | 267/141.1 |
| 5,951,252 A * | 9/1999 | Muylaert | ................ | B64C 27/39 |
| | | | | 416/107 |
| 6,200,097 B1 * | 3/2001 | Mouille | .................. | B64C 27/35 |
| | | | | 416/107 |
| 7,354,248 B2 * | 4/2008 | Zinni | .................... | B64C 27/322 |
| | | | | 267/141 |
| 8,882,462 B2 * | 11/2014 | Schmaling | ............ | B64C 27/322 |
| | | | | 416/103 |
| 2007/0196210 A1* | 8/2007 | Carbaugh | ............. | B64C 27/322 |
| | | | | 416/140 |
| 2010/0247312 A1* | 9/2010 | Girard | ..................... | B64C 27/35 |
| | | | | 416/134 A |
| 2011/0243734 A1 | 10/2011 | Schmaling et al. | | |
| 2013/0243597 A1* | 9/2013 | Perrin | .................. | B64C 27/008 |
| | | | | 416/131 |

FOREIGN PATENT DOCUMENTS

| | | |
|---|---|---|
| FR | 2297166 | 8/1976 |
| FR | 2434079 | 3/1980 |
| FR | 2523071 | 9/1983 |
| FR | 2551723 | 3/1985 |
| FR | 2636914 | 3/1990 |
| FR | 2760425 | 9/1998 |

* cited by examiner

ROTORCRAFT ROTOR INCLUDING A FLAPPING ABUTMENT MECHANISM, AND A ROTORCRAFT

CROSS REFERENCE TO RELATED APPLICATION

This application claims priority to French patent application No. FR 14 00462 filed on Feb. 21, 2014, the disclosure of which is incorporated in its entirety by reference herein.

BACKGROUND OF THE INVENTION (1) Field of the Invention

The present invention relates to a rotorcraft rotor, and also to a rotorcraft provided with such a rotor.

The invention thus lies in the technical field of rotorcraft rotors. More specifically, the invention lies in the field of abutments that are fitted to such rotors in order to limit the flapping movement of lift elements carried by the hub of such a rotor.

(2) Description of Related Art

A rotorcraft usually has at least one rotor for providing the rotorcraft with at least some of its lift and possibly also with propulsion.

A rotor comprises a hub that is set into rotation by a mast. The hub then carries at least two lift assemblies. Consequently, each lift assembly has a blade that is connected to the hub by means of a retention and mobility member. In particular, each blade may comprise a lift element that is fastened to a cuff, or indeed a lift element that has a cuff that is incorporated therewith.

For example, a retention and mobility member may include a hinge referred to as a "spherical abutment". Each spherical abutment may have one strength member fastened to the hub and another strength member fastened to a cuff, regardless of whether the cuff is or is not incorporated in a lift element.

The blades are thus substantially plane elongate elements that are carried transversely by the hub. The blades are mounted on the hub by individual members for mounting the blades on the hub. The individual member includes the retention and mobility members for connecting the lift assemblies to the hub.

The hub may be a hub that has a plurality of plates, and in particular two plates secured to a mast. By way of example, one strength member of each retention and mobility member may be fastened to both of the plates by a respective pin.

In another embodiment, the hub may have a single plate that is fastened to the mast, with that plate having radial arms defining openings. Each retention and mobility member is optionally positioned in each of the openings, being secured to the plate via one of its strength members. A cuff then extends on either side of the plate going from the retention and mobility member towards a lift element.

The mounting members are fitted respectively to each of the blades at their root ends in order to allow them to be controlled by an operator. For example, mounting the blades in movable manner on the hub enables a rotorcraft pilot to act in flight to cause the pitch of the blades to vary collectively or cyclically in order to have an influence on the behavior of the rotorcraft with respect to its lift and/or to its propulsion.

The ability of the blades to move relative to the hub allows them to perform lead/lag movement, pitch movement, and upward and downward flapping movement. The notions of up and down should be considered relative to the direction in which the axis of rotation of the rotor extends. While the rotor is rotating at a nominal speed, the blades are spontaneously driven upwards under the effects of centrifugal force and of lift. When the rotor is stopped, the blades are subjected only to the force of gravity and they thus tend naturally to droop downwards because of their weight.

The rotor is thus commonly fitted with an abutment mechanism that limits the amount of movement the blades can perform in flapping under the effect of forces external to the rotorcraft.

In one embodiment, the abutment mechanism may comprise, for each blade, a lower abutment member and an upper abutment member that forms obstacles to the individual flapping movements of the blades respectively downwards and upwards. The abutment mechanisms include a lower abutment track and an upper abutment track that are arranged on a retention and mobility member. For example, one of the strength members of a spherical abutment may carry an abutment skid having an abutment track.

In the event of unexpected flapping movement of a blade, an abutment track comes into contact with an abutment member, thereby limiting the flapping movement of that blade.

A particular function of the abutment mechanism is to limit the flapping movement of the blades when starting the rotor, and more particularly so when in the presence of wind. The abutment mechanism may also limit the flapping movement of the blades during an operation of folding the blades. In particular when in the presence of spherical abutments hinging respective blades of the hub, each abutment mechanism tends to protect the corresponding spherical abutment while on the ground by preventing a blade in the absence of centrifugal force from performing a flapping movement that might give rise to delamination of the elements making up the spherical abutment.

While the rotor is rotating, the upper abutment members must not oppose upward movement of the blades. The abutment mechanism may then provide means for retracting the upper abutment members while the rotor is in service.

The upper abutment members are then movably mounted on the hub to move between two positions. A first position is an engagement position for the upper abutment members relative to the corresponding abutment tracks in order to act while the rotor is stationary to limit the ability of the blades to move in flapping between the lower abutment members and the upper abutment members associated therewith. A second position is a disengagement position for the upper abutment members, thus making it possible in flight for the blades to move freely in upward flapping.

To summarize, an upper abutment mechanism usually includes one abutment member per lift assembly, an abutment track carried by a lift assembly, e.g. by its retention and mobility member and refraction means capable of positioning an abutment member so that it faces an abutment track, when necessary.

Furthermore, the abutment mechanism includes a low abutment ring that is common to all of the blades. This low abutment ring is movable in a groove.

In flight, only one blade at a time can move downwards, and it pushes the ring in an opposite direction. The ring therefore does not impede flapping of the lift element.

In contrast, when on the ground, with the rotor rotating slowly or stationary, the lift assemblies come simultaneously into contact with the ring, thereby mutually preventing them from moving.

An abutment mechanism for a blade thus comprises a low abutment ring that is common to all of the lift elements and one retractable high abutment per lift element. Such a ring is sometimes referred to as a "reciprocal ring".

Those two abutment systems are independent and tend to increase the number of mechanical parts needed in a space that is restricted by its very nature.

Furthermore, on a heavy aircraft, the low abutment ring may present weight that is not negligible, and in flight it may generate unbalance that needs to be taken into consideration.

Document U.S. Pat. No. 2,719,593 describes a rotorcraft provided with a plurality of blades hinged to a rotor head, in particular via a "drag" hinge that allows the blade to perform lead/lag movement, a flapping hinge, referred to as a "flapping link", that allows the blade to perform flapping movement, and a pitch hinge that allows the blade to perform pitch movement. The flapping hinge is interposed between the pitch hinge and the drag hinge.

For each blade, the aircraft has a flapping retention mechanism for holding the blade in a given position. That mechanism comprises a hook connected by vertical arms to the flapping hinge and constrained to move in flapping with the blade. The hook is secured to a weight in order to respond to centrifugal force by tilting about a horizontal axis of rotation that is hinged to the vertical arms.

The hook comprises a U-shaped jaw defining a groove, the U-shape being obtained with an arcuate bottom wall and two symmetrical vertical walls. The jaw is then engaged around a peg of the drag hinge when the rotor is stationary in order to prevent upward flapping of the blade, and is disengaged from the peg when the rotor is put into rotation.

The peg is then secured to the blade during its lead/lag movement, the hook being secured to the blade during its lead/lag movement and its flapping movement.

That document U.S. Pat. No. 2,719,593 thus does not provide teaching about a lift assembly connected to a hub by a spherical abutment constituting a three-axis hinge.

Such a spherical abutment presents the particular feature of its component elements becoming delaminated in the event of flapping movements taking place in the absence of a high level of centrifugal force.

Also known are the following documents: FR 2 636 914, U.S. Pat. No. 4,368,006, FR 2 434 079, FR 2 297 166, U.S. Pat. Nos. 3,533,713, 2,928,478, 2,614,640, 2,481,747, 2,151,215, 4,549,852, FR 2 551 723, and FR 2 523 071.

Document FR 2 636 914 describes a mechanism having a low reciprocal abutment ring that is common to all of the lift elements, together with one retractable high abutment per lift element. A high abutment comprises a lever having two arms, a first arm constituting an abutment finger and a second arm carrying a flyweight.

Document FR 2 434 079 describes a mechanism having a low abutment reciprocal ring common to all of the lift elements and one high abutment per lift element, which high abutment comprises a lever with a bend.

Document U.S. Pat. No. 4,368,006 suggests using a lever that has a rounded surface.

Document FR 2 297 166 describes a lift element secured to a fork that is fastened via a spherical elastomer bearing to a hub and via a short shaft to an elastomer centering bearing.

A first stop element is free to move in pivoting about the short shaft and includes a local projection having a first flat abutment surface. A second stop element is supported by the hub and includes a local projection having a second flat abutment surface suitable for preventing downward flapping of the lift element in flight by interfering with the first flat abutment surface.

A static droop stop is provided to limit flapping of the lift element while the rotor is stopped or rotating at a low speed of rotation. That static droop stop is provided with a contact element that is connected to a spring and that is suitable for coming up against the first flat abutment surface.

Document U.S. Pat. No. 2,614,640 describes a lift element connected to a hub via a drag hinge and via a flapping hinge and a pitch hinge like Document U.S. Pat. No. 2,719,593.

An abutment mechanism comprises a flap that is movable in pivoting relative to the drag hinge. That flap is for limiting downward flapping of the lift element by interference with a surface of the flapping hinge.

That flap is movable in pivoting by a lever having a flyweight.

Document U.S. Pat. No. 4,549,852 describes a lever that is movable in pivoting relative to a hub. That lever is suitable for moving a piston in order to block a high flapping track or a low flapping track of an elastomer bearing.

Document FR 2 551 723 describes an abutment mechanism having distinct low and high abutment devices for each lift element.

Each low abutment device comprises a movable member having a roller presenting a convex abutment surface and a flyweight arranged at the end of an arm. The movable member is mounted to pivot about a pin for retaining a lift assembly to a hub.

Each high abutment device includes a nose and a lower flyweight that is returned by a spring.

Document FR 2 523 071 describes abutment means supported by a hub. The abutment means are movable in pivoting relative to the hub under the effect of centrifugal force and in opposition to the action of resilient means. The abutment means are provided with two members that tilt about axes that are substantially parallel.

Document U.S. Pat. No. 3,533,713 describes a rotor having a hub that is movable relative to a mast, the rotor being of the "gimbal" type. The rotor is also provided with a mechanism for blocking the hub in a position relative to the mast. That document is thus remote from the technical field of blade abutments.

Likewise, Documents U.S. Pat. Nos. 2,928,478, 2,481, 747, and 2,151,215 describe devices for blocking the angle of inclination of a hub that is capable of pivoting relative to a rotor mast.

Also known are Documents US 2011/243734 and FR 2 760 425.

BRIEF SUMMARY OF THE INVENTION

The object of the present invention is to propose a rotor provided with a mechanism for limiting the flapping stroke of blades of a main rotor of a rotorcraft.

According to the invention, a rotor for a rotorcraft has a plurality of lift assemblies and a drive system for driving the lift assemblies in rotation about an axis of rotation. The drive system includes a hub that is movably solely in rotation about said axis of rotation, each lift assembly having a retention and mobility member connected to the hub in order to hinge the lift assembly to the hub about three pivot directions. The rotor is provided with one abutment mechanism for each lift assembly in order to limit the upward and downward flapping movement of the lift assembly under predetermined conditions.

The rotorcraft rotor is thus not provided with a gimbal mechanism, but rather with a hub that is stationary relative to a rotor mast. Furthermore, a lift assembly is not provided with a succession of hinges, but has a single retention and mobility member such as a laminated spherical abutment.

Each abutment mechanism of a lift assembly comprises:

an abutment projection secured to the lift assembly, each abutment projection having an abutment end with an inner face facing the drive system and an outer face opposite from the inner face;

at least one lever that is pivotable about a pivot shaft secured to the drive system, each lever extending longitudinally from a flyweight towards a hook that defines a blind groove suitable for longitudinally surrounding said abutment end in an engagement position and for releasing said abutment end in a disengagement position obtained under the effect of centrifugal force, said hook being provided with two walls in elevation extending up from a bottom wall so as to form a J-shaped periphery that defines said groove, a first wall in elevation having an upper bearing zone for blocking said inner face as a result of downward flapping movement of the lift assembly, and a second wall in elevation having a lower bearing zone for blocking said outer face as a result of upward flapping of the lift assembly, said upper bearing zone being present in a higher horizontal plane overlying a lower horizontal plane intersecting the lower bearing zone; and return means acting on said lever tending to position it in the engagement position.

The term "horizontal" plane is used to designate a plane that is substantially perpendicular to the direction of gravity when the aircraft is standing on flat ground.

Consequently, both when the rotor is stopped and also when the lift assemblies are rotating about the axis of rotation at a speed that is less than a threshold, each return means exerts a force on at least one lever so as to position it in an engagement position.

Such return means may be a fraction spring extending from the drive system towards a lever, or else a rotary spring interposed between the lever and the corresponding pivot shaft, for example.

In this position, the abutment end of a lift assembly is inserted in the groove of at least one hook.

In the event of the lift assembly performing a flapping movement in a downward direction, i.e. towards the ground, the inner face of the abutment end comes into abutment against the upper bearing zone of the hook. The inner face then tends to cause the hook to pivot in a first pivot direction. Nevertheless, the asymmetrical design of the bearing zones means that such pivoting is prevented by the lower bearing zone interfering with the outer face.

Likewise, in the event of the lift assembly performing flapping movement in an upward direction, the outer face of the abutment end comes into abutment against the lower abutment zone of the hook. The outer face then tends to induce pivoting of the hook in a second pivot direction opposite to the above first direction. Nevertheless, the asymmetrical design of the bearing zones means that such pivoting is prevented by the upper bearing zone interfering with the inner face.

The specific shape of the walls defining the groove thus tends to prevent unwanted pivoting of the hook.

When the lift assemblies are rotating about the axis of rotation at a speed greater than the above-mentioned threshold, centrifugal force acting on the flyweight causes the lever to move towards a disengagement position. The lever then pivots in the second direction. The J-shape of the periphery of the groove can facilitate such movement.

Under such circumstances, the hook no longer limits flapping movements of the lift assembly.

Consequently, each lift assembly is provided with a single mechanism using a hook to limit the flapping movements of a lift assembly via a projection from said lift assembly.

Furthermore, the lever is not secured to the lift assembly. This characteristic avoids arranging a non-negligible mass on a moving member.

The rotor may also include one or more of the following characteristics.

For example, the drive system includes at least members present in a list comprising the hub together with a rotor mast secured to the hub and a scissors link element, and at least one lever is attached to one of the members in the list.

Furthermore, said pivot shaft may extend along an axis of symmetry contained in a horizontal reference plane situated above the lower bearing zone and below the upper bearing zone when the lever is in the engagement position.

This characteristic encourages retention of an abutment end in a groove.

Furthermore, the inner face of an abutment projection is possibly not parallel to the first wall in elevation of a hook, and said outer face is not parallel to the second wall in elevation in the engagement position.

This characteristic also encourages retention of an abutment end in a groove.

Furthermore, the first wall in elevation of a hook is optionally not parallel to the second wall in elevation, the first wall in elevation coming closer to the second wall in elevation on going away from the bottom wall.

This characteristic also encourages retention of an abutment end in a groove.

Furthermore, the pivot shaft extends along an axis of symmetry contained in a horizontal reference plane, and said flyweight of a hook is offset relative to the horizontal reference plane.

This characteristic encourages the lever to pivot under the effect of centrifugal force.

Furthermore, at least one mechanism may include a redundant lever, i.e. two identical levers arranged symmetrically on either side of a plane in which the lift assembly extends, the two levers being movable in pivoting about a common pivot shaft.

This variant seeks to make the hook of a mechanism redundant for safety purposes.

The pivot shaft may then have a single rod that is common to both levers, or else one rod per lever.

Furthermore, at least one mechanism may include a support carrying the pivot shaft, the support being fastened to the drive system.

Each lever of an abutment mechanism is then connected to the drive system by the pivot shaft and the support.

Furthermore, the support may be provided with a pad for each lever in order to limit the pivoting of the lever.

Furthermore, the support is provided with an abutment track facing said inner face in order to represent a clear low abutment that is active in flight to block said inner face as a result of downward flapping movement reaching a predetermined maximum amplitude. The abutment track is located longitudinally between the flyweight and the groove of the lever when in the engagement position.

The abutment mechanism may also act as an abutment in flight in order to limit the amplitude of the flapping of the lift element to some maximum amplitude. In other words, the hook limits the flapping of the lift element in the upward and downward directions to some minimum value so long as the rotor is rotating at a speed below a threshold. In contrast, the abutment track of the support limits flapping of a lift assembly in the downward direction only to some maximum amplitude whenever the rotor is rotating at a speed greater than a threshold.

In addition, the abutment end may include an edge face extending between the inner face and the outer face and facing the bottom wall in the engagement position, said edge face being arcuate in order to allow the pitch of the lift element to be modified.

In addition to a rotor, the invention provides a rotorcraft including such a rotor.

BRIEF DESCRIPTION OF THE SEVERAL VIEWS OF THE DRAWINGS

The invention and its advantages appear in greater detail from the context of the following description of examples given by way of illustration with reference to the accompanying figures, in which.

Elements shown in more than one of the figures are given the same references in each of them.

DETAILED DESCRIPTION OF THE INVENTION

Figure 1:
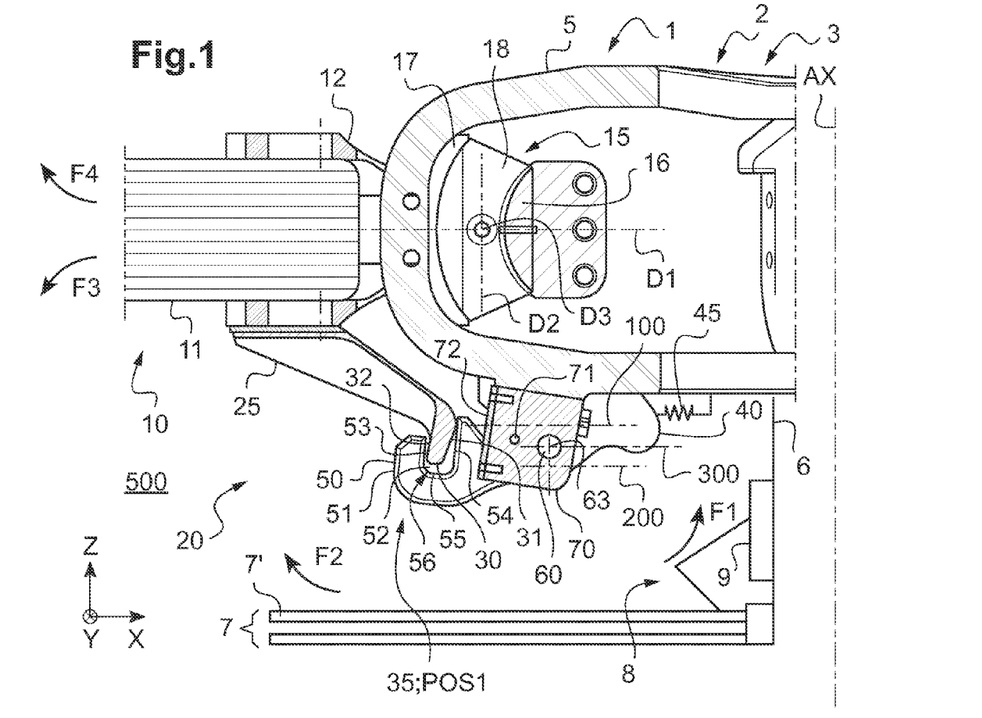
FIG. 1 is a view of a rotorcraft rotor fitted with a lever of an abutment mechanism in the engagement position.

Three mutually orthogonal directions referenced X, Y, and Z are shown in FIG. 1.

The first direction X is said to be "longitudinal".

The second direction Y is said to be "transverse".

Finally, the third direction Z is said to be "in elevation".

FIG. 1 shows a rotorcraft 1 having a rotor 2. The rotorcraft 1 and the rotor 2 are shown diagrammatically in part in order to avoid overburdening FIG. 1. The rotor 2 may be a rotor for providing the rotorcraft with lift and for providing it with propulsion.

The rotor 2 is provided with a drive system 3 for controlling and setting into rotation a plurality of lift assemblies 10.

The drive system comprises a hub 5 secured to a rotor mast 6 that is rotatable about an axis of rotation AX. The hub 5 possesses at least one plate for carrying a plurality of lift assemblies 10. The hub is thus movable solely in rotation about the axis of rotation. The hub is thus not a hub that is hinged to a mast.

Thus, the hub may be provided with a top plate and with a bottom plate defining in elevation a space that can receive parts of the lift assemblies. Alternatively, the hub may for example comprise a single plate provided with recesses.

Independently of the way in which the hub is embodied, each lift assembly 10 may comprise a lift element 11 and a cuff 12 incorporated with the lift element or fastened to the lift element 11. The cuff constitutes the member serving to fasten the lift element to a retention and mobility member 15 secured to the hub 5.

Such a retention and mobility member 15 gives the lift assembly 10 freedom to perform pitch movements about a first pivot axis D1, lead/lag movement about a second pivot axis D2, and flapping movement about a third pivot axis D3.

This retention and mobility member 15 may be a laminated abutment having a strength member referred to as a "first" strength member 16 that is fastened to the cuff, a strength member that is referred to as a "second" strength member 17 that is fastened to the hub, and a laminated member 18 connecting together the first and second strength members 16 and 17.

Furthermore, the rotor may have a swashplate assembly 7 for controlling the pitch of the lift assembly 10 by means of pitch rods that are not shown.

This swashplate assembly may co-operate with a rotary scissors link 8. This rotary scissors link connects a rotary swashplate 7' of the swashplate assembly 7 to the rotor mast 6 via a scissors link driver 9. Reference may be made to the literature for a more detailed description of these members.

Furthermore, the rotor 2 is provided with an abutment mechanism 20 for each lift assembly in order, at least, to limit the flapping movement of the lift assembly during predetermined stages. In particular, each mechanism is active for the purpose of at least minimizing this flapping movement when the speed of rotation of the rotor is below a threshold speed.

Each abutment mechanism 20 includes an abutment projection 25 secured to a lift assembly 10.

Such a projection may be in the form of a rod, possibly a bent rod, e.g. secured to the cuff of the lift assembly. This rod then extends from the lift assembly towards a free end that is refereed to as the "abutment" end 30.

The abutment end has an inner face 31 facing the drive system 3 and in particular the rotor mast, and an outer face 32 that is opposite from the inner face 31. The inner face 31 and the outer face 32 need not be parallel to each other.

In addition, the abutment mechanism 20 is provided with at least one lever 35 suitable for blocking the flapping abutment end when the rotor is rotating at a speed of rotation below a threshold speed.

The lever extends longitudinally from a flyweight 40 to a hook 50. More precisely, the lever extends longitudinally in line with the abutment end 30, e.g. along a radius of the rotor.

Consequently, the lever comprises an arm carrying the flyweight 40 at one of its ends, and the hook 50 at its other end. Between these two ends, the lever is crossed by a pivot shaft 60 imparting a degree of freedom to move in pivoting. The pivot shaft 60 extends transversely between ends 61 and 62 along an axis of symmetry 63, this axis of symmetry 63 being contained in a horizontal reference plane 300.

The pivot shaft is secured to the drive system, e.g. via a support 70.

Such a support may then be fastened by way of example to the hub 5 or to the rotor mast 6, or indeed to the scissors link driver 9.

The lever can then pivot about the pivot shaft 60 in a plane in elevation given reference 500, e.g. containing the axis of rotation AX of the rotor and the abutment end 30 of the mechanism 20.

In particular, the flyweight is offset in elevation relative to the horizontal reference plane in order to cause the lever to pivot in a direction represented by arrow F1 under the effect of centrifugal force. Pivoting in this direction is referred to as the "disengagement" direction for convenience.

Furthermore, the mechanism includes return means 45 exerting a force on the lever in order to impart pivoting represented by arrow F2 in a direction referred to as the "engagement" direction. This engagement direction is opposite to the above-described disengagement direction.

In addition, the hook 50 has a jaw 51 defining a groove 52 into which the abutment end can penetrate.

Figure 7:
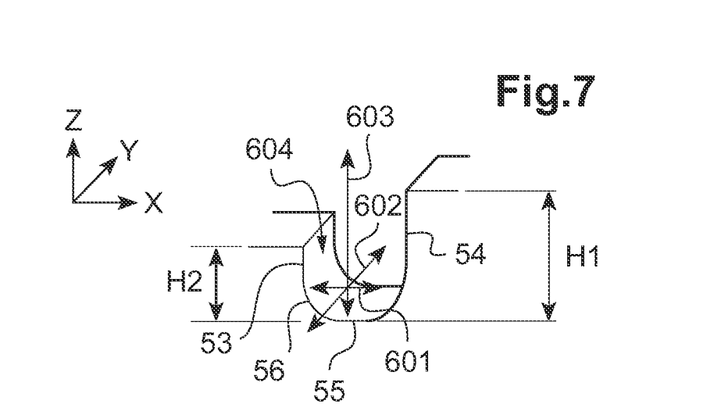
FIG. 7 is a view of a groove in a lever.

For this purpose, and with reference to FIG. 7, the hook 50 presents a J-shaped periphery 56 defining the groove 52. This periphery 56 is embodied by a first wall in elevation 54 and a second wall in elevation 53 projecting up from a bottom wall 55. The first wall in elevation 54 is interposed longitudinally between the second wall in elevation and the axis of rotation AX. In addition, this first wall in elevation 54 projects from the bottom wall 55 over a first height H1 that is greater than a second height H2 of the second wall in elevation 53, thereby giving the periphery a J-shape.

Consequently, the groove 52 is a groove:

that is not obstructed transversely along an axis 602 so as to open to the outside of the hook;

that is obstructed longitudinally along an axis 601 by the first wall in elevation and by the second wall in elevation; and that is obstructed in elevation along an axis 603 solely at one of its ends by the bottom wall, the other end thus presenting an opening 604 in elevation through which an abutment end can pass.

The axis 601 represents an axis in which the lever extends longitudinally from the flyweight to the hook. The axis 602 represents a transverse axis of the lever extending in the thickness direction of the lever. Finally, the axis 603 represents an axis in elevation of the lever.

Under such circumstances, the groove may be referred to as being "blind" since it is partially obstructed in elevation.

Figure 3:
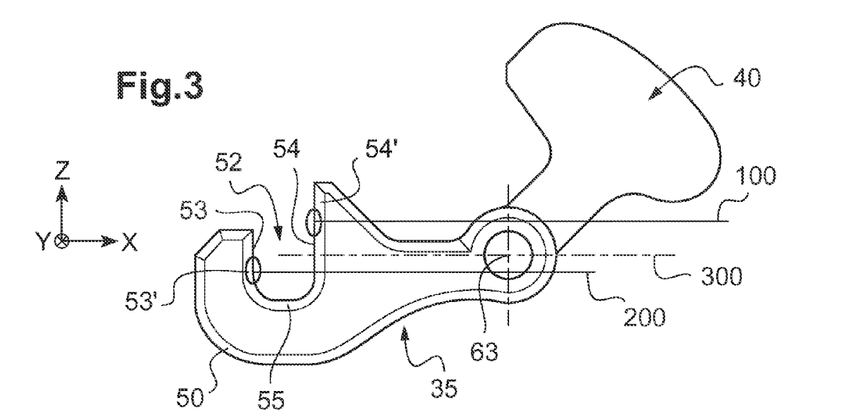
FIG. 3 is a view of a lever.

With reference to FIG. 3, the first wall in elevation 54 includes an upper bearing zone 54' for blocking the inner face 31 as a result of the lift assembly 10 flapping downwards.

Likewise, the second wall in elevation 53 has a lower bearing zone 53' for blocking the outer face 32 as a result of the lift assembly 10 flapping upwards.

Consequently, the upper bearing zone 54' is present in a higher horizontal plane 100 that lies above a lower horizontal plane 200 containing the lower bearing zone 53' when the lever is in a position referred to as its "engagement" position.

For example, the horizontal reference plane 300 containing the axis of symmetry 63 of the pivot shaft 60 is situated above the lower horizontal plane 200 and below the higher horizontal plane 100 in this engagement position.

With reference to FIG. 1, when the rotor is driven in rotation about the axis of rotation AX at a speed greater than a threshold, the lever is positioned by the return means 45 in the engagement position.

In this position, the abutment end 30 is arranged in the groove 52 of the hook. The inner face 31 of the abutment end then faces the first wall in elevation 54 and the outer face 32 of the abutment end then faces the second wall in elevation 53. In the absence of flapping, clearance may separate the inner face 31 from the first wall in elevation 54, and other clearance may separate the outer face 32 from the second wall in elevation 53.

If the lift assembly tends to flap downwards as represented by arrow F3, the inner face comes into collision against the upper bearing zone 54'.

If the force exerted by the abutment end on the lever tends to cause the lever to pivot, the lower bearing zone 53' in turn enters into collision with the outer face of the abutment end. Pivoting of the lever is thus prevented.

Consequently, the mechanism may be referred to as "self-blocking", and it guarantees that downward flapping movement of the lift element is stopped.

Likewise, if the lift assembly tends to flap upwards as represented by arrow F4, the outer face 32 enters into collision with the lower bearing zone 53'.

If the force exerted by the abutment end on the lever tends to cause the lever to pivot, then the upper bearing zone 54' in turn enters into collision with the inner face of the abutment end. Pivoting of the lever is thus stopped, thereby making it possible to avoid the abutment end disengaging from the groove of the hook.

Consequently, in the engagement position POS1 as shown in FIG. 1, the mechanism constrains the freedom of movement in flapping of the lift assembly both upwards and downwards, ignoring clearance.

In order to optimize the operation of the mechanism, the inner face 31 of the abutment end need not be parallel to the first wall in elevation 54 when in the engagement position POS1. Likewise, the outer face 32 need not be parallel to the second wall in elevation 53 when in the engagement position POS1.

In addition, first wall in elevation 54 is preferably not parallel to the second wall in elevation 53, the first wall in elevation 54 coming closer to the second wall in elevation 53 on going away from the bottom wall 55. The groove is thus in the shape of a cylinder on a base that is substantially trapezoidal.

Figure 4:
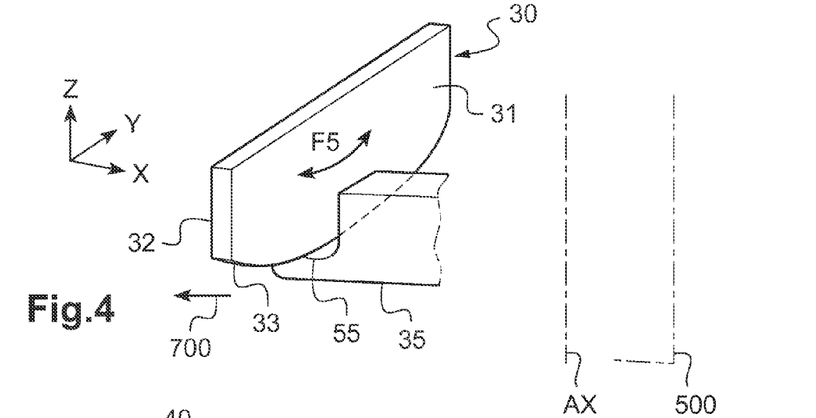
FIG. 4 is a view of a rounded abutment end.

Furthermore, and with reference to FIG. 4, the abutment end 30 includes an edge face 33 that extends longitudinally in the direction of an arrow 700 from the inner face 31 to the outer face 32. This edge face 33 then faces the bottom wall 55 in the engagement position POS1, as shown in FIG. 4.

Figure 5:
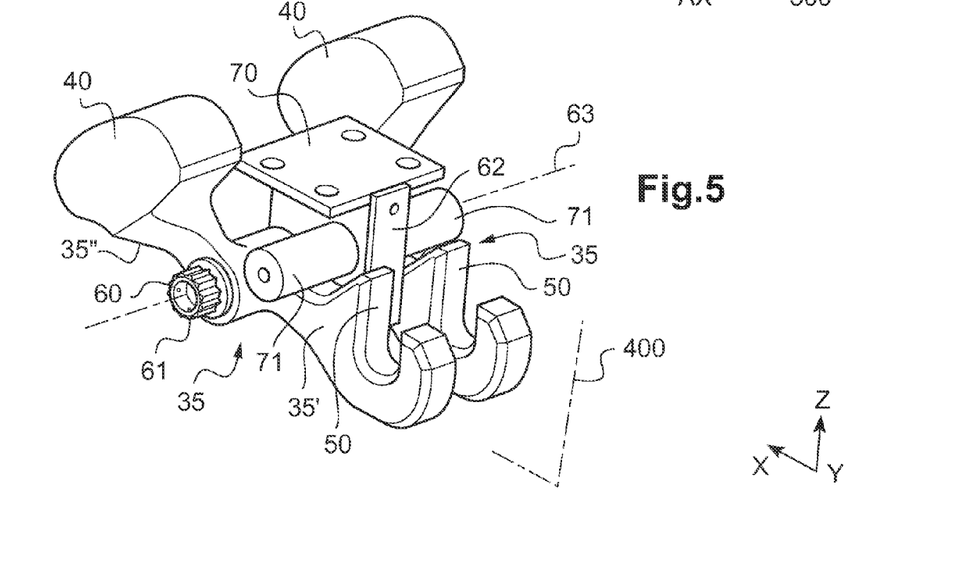
FIG. 5 is a view of an abutment mechanism having a redundant lever and shown in the engagement position.

Consequently, this edge face 33 may be arcuate in order to allow the pitch of the lift element 10 to be modified. Modifying pitch causes the abutment end to pivot as represented by double-headed arrow F5. FIG. 5 shows clearly that the arcuate shape of the edge face 33 does not impede this pivoting pitch movement of the lift assembly.

Consequently, when the rotor is set into rotation about the axis of rotation AX at a speed that is below a threshold, the mechanism 20 blocks movements of the lift assembly that correspond to flapping, but does not block its pitch movements.

Figure 2:
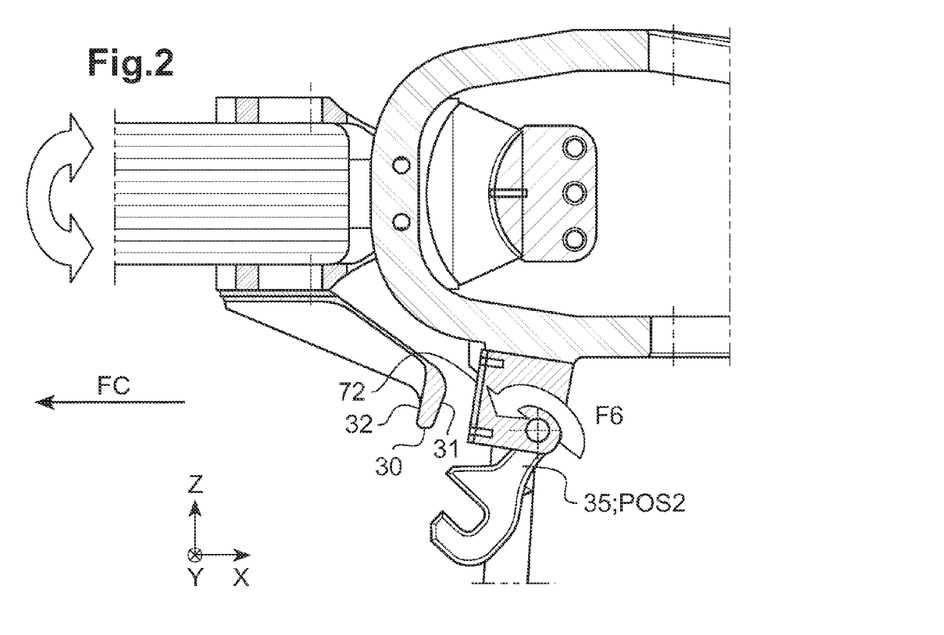
FIG. 2 is a view of a rotorcraft rotor fitted with a lever of an abutment mechanism in the disengagement position.

With reference to FIG. 2, when the rotor is set into rotation about the axis rotation AX at a speed that is greater than a threshold, centrifugal force FC causes the lever 35 to pivot towards a disengagement position POS2.

In this position the abutment end 30 is no longer engaged in the hook.

It should be observed that the support 70 may include a removable abutment track 72. This abutment track may serve to avoid excessive large-amplitude downward flapping movement in flight by interfering with the abutment end 30. The abutment track may be removable in order to be replaced if it becomes worn.

Figure 6:
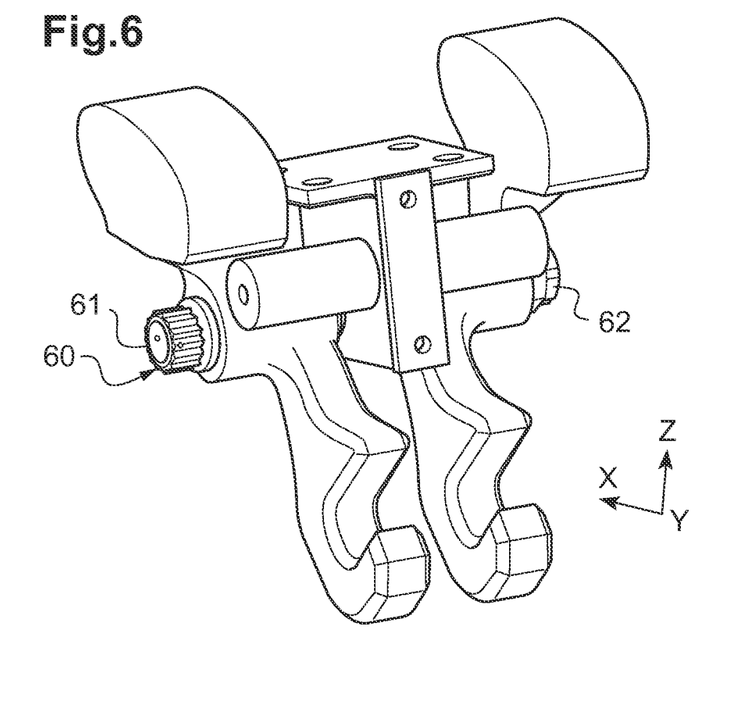
FIG. 6 is a view of an abutment mechanism having a redundant lever and shown in the disengagement position.

FIGS. 5 and 6 show an abutment mechanism that is provided for safety reasons with a redundant lever.

Thus, the mechanism has two identical levers 35 arranged symmetrically on either side of a plane 400 in which the lift assembly 10 extends, both performing the same function. The two levers 35 are movable in pivoting about the same pivot shaft 60.

Consequently, the mechanism may have a single rod passing through a plate in elevation of the support 70, with the levers being hinged on either side of the support about the rod.

In another variant, the pivot shaft may have two rods on the same axis extending on either side of the support.

Independently of the number of levers, the mechanism may include one pad 71 per lever 35 in order to limit the pivoting of the lever 35 under the effect of centrifugal force. A given pad may co-operate by interference with a first segment of the lever extending between the pivot axis and the hook, and it may also co-operate by interference with a second segment of the lever extending between the pivot axis and the flyweight.

In FIG. 5, the first segment may come into abutment against the pad in the engagement position POS1. Conversely, the second segment may be in abutment against the pad in the disengagement position POS2.

Naturally, the present invention may be subjected to numerous variations as to its implementation. Although several embodiments are described above, it will readily be understood that it is not conceivable to identify exhaustively all possible embodiments. It is naturally possible to envisage replacing any of the means described by equivalent means without going beyond the ambit of the present invention.

What is claimed is:

1. A rotor for a rotorcraft, the rotor comprising:
    a plurality of lift assemblies and a drive system for driving the lift assemblies in rotation about an axis of rotation, the drive system including a hub that is movably solely in rotation about the axis of rotation, each of the plurality of lift assemblies having a retention and mobility member connected to the hub in order to hinge the lift assembly to the hub about three pivot directions, the rotor having an abutment mechanism for each lift assembly in order to limit the upward and downward flapping movement of the lift assembly under predetermined conditions;
    wherein each abutment mechanism for a lift assembly comprises:
        an abutment projection secured to the lift assembly, the abutment projection having an abutment end with an inner face facing the drive system and an outer face opposite from the inner face, the abutment end having an asymmetrical configuration providing the inner face with an upper bearing zone and the outer face with a lower bearing zone;
        at least one lever that is pivotable about a pivot shaft secured to the drive system, the at least one lever extending longitudinally from a flyweight towards a hook that defines a blind groove suitable for longitudinally surrounding the abutment end in an engagement position and for releasing the abutment end in a disengagement position obtained under the effect of centrifugal force, the hook being provided with two walls in elevation extending up from a bottom wall so as to form a J-shaped periphery that defines the groove, a first wall in elevation having an upper bearing zone, which in the engagement position, blocks the upper bearing zone of the inner face as a result of downward flapping movement of the lift assembly, and a second wall in elevation having a lower bearing zone, which in the engagement position, blocks the lower bearing zone of the outer face as a result of upward flapping of the lift assembly, in the engagement position, the upper bearing zone of the first wall and the upper bearing zone of the inner face intersecting in a higher horizontal plane overlying a lower horizontal plane intersecting the lower bearing zone of the second wall and the lower bearing zone of the outer face; and
        return means acting on the lever tending to position it in the engagement position.

2. A rotor according to claim 1, wherein the pivot shaft extends along an axis of symmetry contained in a horizontal reference plane situated above the lower bearing zone and below the upper bearing zone when the lever is in the engagement position.

3. A rotor according to claim 1, wherein, in the engagement position, the inner face is not parallel to the first wall in elevation, and the outer face is not parallel to the second wall in elevation.

4. A rotor according to claim 1, wherein the first wall in elevation is not parallel to the second wall in elevation, the first wall in elevation coming closer to the second wall in elevation on going away from the bottom wall.

5. A rotor according to claim 1, wherein the pivot shaft extends along an axis of symmetry contained in a horizontal reference plane, the flyweight being offset relative to the horizontal reference plane.

6. A rotor according to claim 1, wherein at least one mechanism includes a redundant lever, comprising two identical levers arranged symmetrically on either side of a plane in which the lift assembly extends, the two levers being movable in pivoting about a common pivot shaft.

7. A rotor according to claim 1, wherein at least one mechanism includes a support carrying the pivot shaft, the support being fastened to the drive system.

8. A rotor according to claim 7, wherein the support is provided with a pad for the at least one lever in order to limit the pivoting of the lever.

9. A rotor according to claim 7, wherein the support is provided with an abutment track facing the inner face comprising a clear low abutment that is active in flight to block the inner face as a result of downward flapping movement reaching a predetermined amplitude.

10. A rotor according to claim 1, wherein the abutment end includes an edge face extending between the inner face and the outer face and facing the bottom wall in the engagement position, the edge face being arcuate in order to allow the pitch of the lift element to be modified.

11. A rotor according to claim 1, wherein the drive system includes the hub together with a rotor mast secured to the hub and a scissors link element, and at least one lever is attached to the drive system.

12. A rotorcraft, wherein the rotorcraft has a rotor according to claim 1.

13. A rotor for a rotorcraft, the rotor comprising:
    a plurality of lift assemblies and a drive system for driving the lift assemblies in rotation about an axis of rotation, the drive system including a hub that is movably solely in rotation about the axis of rotation, each of the plurality of lift assemblies hingedly connected to the hub about three pivot directions, the rotor having an abutment mechanism for each lift assembly in order to limit the upward and downward flapping movement of the lift assembly under predetermined conditions;
    wherein each abutment mechanism for a lift assembly comprises:
        an abutment projection secured to the lift assembly, the abutment projection having an abutment end with an inner face facing the drive system and an outer face opposite from the inner face, the abutment end having an asymmetrical configuration providing the inner face with an upper bearing zone and the outer face with a lower bearing zone;
        at least one lever that is pivotable about a pivot shaft secured to the drive system, the at least one lever extending longitudinally from a flyweight towards a hook that defines a blind groove suitable for longitudinally surrounding the abutment end in an engagement position and for releasing the abutment end in a disengagement position obtained under the effect of centrifugal force, the hook being provided with two walls in elevation extending up from a bottom wall so as to form a J-shaped periphery that defines the groove, a first wall in elevation having an upper bearing zone, which in the engagement position, blocks the upper bearing zone of the inner face as a result of downward flapping movement of the lift assembly, and a second wall in elevation having a lower bearing zone, which in the engagement position, blocks the lower bearing zone of the outer face as a result of upward flapping of the lift assembly, in the engagement position, the upper bearing zone of the first wall and the upper bearing zone of the inner face intersecting in a higher horizontal plane overlying a lower horizontal plane intersecting the lower bearing zone of the second wall and the lower bearing zone of the outer face, with the at least one lever being biased to the engagement position.

14. A rotor according to claim 13, wherein the pivot shaft extends along an axis of symmetry contained in a horizontal reference plane situated above the lower bearing zone and below the upper bearing zone when the lever is in the engagement position.

15. A rotor according to claim 13, wherein, in the engagement position, the inner face is not parallel to the first wall in elevation, and the outer face is not parallel to the second wall in elevation.

16. A rotor according to claim 13, wherein the first wall in elevation is not parallel to the second wall in elevation, the first wall in elevation coming closer to the second wall in elevation on going away from the bottom wall.

17. A rotor according to claim 13, wherein the pivot shaft extends along an axis of symmetry contained in a horizontal reference plane, the flyweight being offset relative to the horizontal reference plane.

18. A rotor according to claim 13, wherein at least one mechanism includes a support carrying the pivot shaft, the support being fastened to the drive system.

19. A rotor according to claim 18, wherein the support is provided with a pad for the at least one lever in order to limit the pivoting of the lever.

20. A rotor according to claim 13, wherein the abutment end includes an edge face extending between the inner face and the outer face and facing the bottom wall in the engagement position, the edge face being arcuate in order to allow the pitch of the lift element to be modified.

* * * * *